United States Patent Office 3,551,792
Patented Dec. 29, 1970

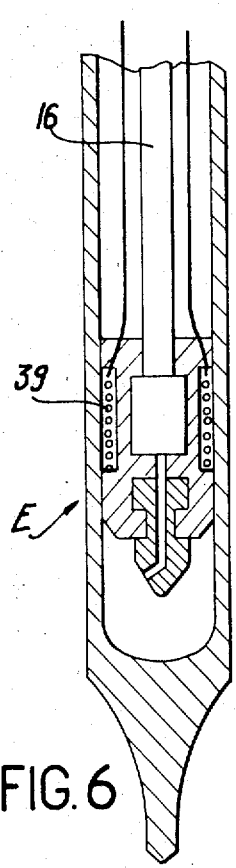
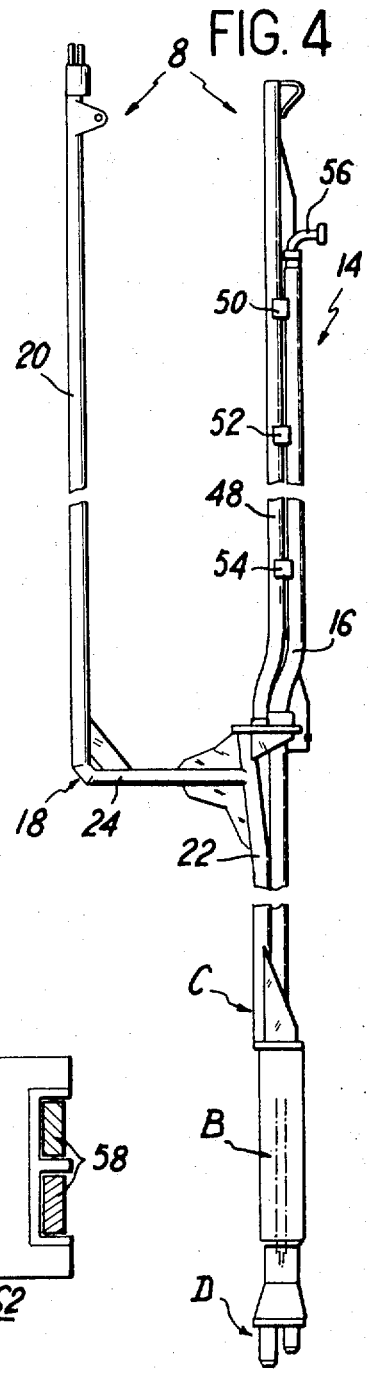
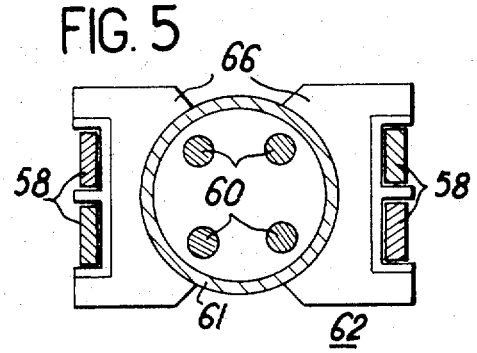

3,551,792
ELECTRON PARAMAGNETIC RESONANCE SPECTROMETER FOR NUCLEAR REACTORS
Daniel Galland and Jacques Perrin, Grenoble, Christian Santier, Meylan, and Pierre Servoz-Gavin and Michel Soutif, Grenoble, France, assignors to Commissariat a l'Energie Atomique, Paris, France
Filed Aug. 21, 1967, Ser. No. 662,060
Claims priority, application France, Sept. 5, 1966, 75,297
Int. Cl. G01n 27/78
U.S. Cl. 324—.5
6 Claims

ABSTRACT OF THE DISCLOSURE

The spectrometer forms part of an installation for detecting faults caused by irradiation in solid, liquid or gaseous specimens placed in proximity to the core of a swimming-pool reactor and for determining the kinetics of fault formation. The installation comprises a cooling system, a spectrometer and a power supply unit which are respectively coupled by means of a pole to a cooling loop, to a resonant cavity containing the specimen to be studied and to a solenoid which produces a continuous, stable and homogeneous magnetic field to which the specimen is subjected. The solenoid comprises a main coil unit made up of two coaxial windings associated either in series or in parallel and separated by an insulating screen as well as an auxiliary coil unit which is intended to compensate for first-order heterogeneities of the magnetic field and which is made up of two identical coaxial windings disposed on each side of the midplane, the complete solenoid assembly being directly cooled by the pool water of the reactor.

---

This invention relates to improvements in an electron paramagnetic resonance spectrometer installation for detecting flaws produced by irradiation in solids and the kinetics of flaw formation, the specimens under study being placed in the tangential channel of a nuclear reactor and close to the reactor core.

An installation of known type has a solenoid which corresponds to the useful dimensions of the channel and which produces a continuous, stable and homogeneous magnetic field, a resonant cavity for receiving the specimen to be studied which is placed in the solenoid, a pole and plug assembly which supports the solenoid and consists of a pole placed inside the channel and comprising a number of ducts and mechanical supports as well as a plug of absorbent material which closes the entrance of the channel and through which said ducts extend, a cooling loop for circulating a liquid coolant through the solenoid, a power supply system and a spectrometer consisting on the one hand of a microwave frequency source connected to said cavity through a waveguide and on the other hand of an electronic detection unit which receives the resonance signal and transmits said signal to an oscilloscope or recording device.

In order that the technical characteristics of the present invention may be more readily understood, there will now be described one embodiment which is given solely by way of example without any limitation being implied.

The principle application for which the invention is intended is the study of flaws in lattices or free radicals produced in a specimen which is placed near a nuclear reactor core within a tangential channel of the reactor and subjected to the action of an intense flux of fast neutrons or γ-rays. The installation according to the invention accordingly comprises a cooling system, a spectrometer and a power supply unit which are respectively coupled by means of a pole to a cooling loop, to a resonant cavity containing the specimen to be studied and to a solenoid which produces a continuous, stable and homogeneous magnetic field to which the specimen is subjected.

The improvements made in said spectrometer in accordance with the present invention permit the utilization of this latter in the vicinity of the core support grid of a pool-type reactor. It will be noted that observations during irradiation can be made with thermal neutron or fast neutron fluxes of the order of $10^{12} n/cm.^2/s$ or under the influence of γ-radiation fluxes of $8.10^7$ REP/hour.

The outstanding features of the installation in accordance with the present invention are the structure and mode of cooling of the solenoid. The solenoid comprises a main coil unit which is made up of two coaxial windings connected either in series or in parallel and separated by an insulating screen or layer as well as a coil unit which is intended to compensate for first-order heterogeneities of the magnetic field and which is made up of two coaxial windings disposed symmetrically on each side of the midplane of the solenoid each of said two coaxial windings have inner and outer layers.

The conductor which forms the windings of the main coil is formed of anodized aluminum wire and is of rectangular cross section, said conductor being usually wound on edge except in the central portion of the outer layer of the inner winding which is wound on the flat.

The discontinuity which is introduced by this method in the structure of the coil unit makes it possible to ensure sufficient homogeneity of the magnetic field. In order to correct the slight defects of symmetry which may result from a slightly faulty axial positioning of one of the main windings with respect to the other, the position of one winding can be made adjustable.

A further distinctive feature lies in the fact that cooling is carried out in a very simple manner by the water which is used in the tank or pool of the reactor and which is in direct contact with the coil unit.

In the electron paramagnetic resonance spectrometer installation according to the invention, the solenoid is supported by one of the two sections of the pole. The section referred-to is constituted by two parallel rectilinear elements of substantial length joined by a short element which is also rectilinear but perpendicular to the other two elements. Said pole section additionally carries the conductors for supplying current to the solenoids and the lower end of the pole is attached to the reactor grid. The other section of the pole which is substantially rectilinear and detachable is intended to carry the resonant cavity and further comprises the waveguide for supplying said cavity, the conductors for supplying the modulation coil which surrounds said cavity and a tube for supplying the coolant gas to the cavity.

The two sections of the pole are assembled by inserting the first section which carries the resonant cavity in the second section whose extremity contains the solenoid and by securing the base which forms part of the second section to the core support grid of the reactor.

The characteristic features of the invention will become more readily apparent from the following description of one exemplified embodiment which, as will be understood, is not intended to set any limitation either on the modes of operation of the invention or on the potential applications thereof. Reference is had to the accompanying drawings, in which:

FIG. 4 shows the two assembled sections of the pole;

FIGS. 5 and 6 are sectional views showing the top and bottom of the nonrectilineal section of the pole;

Figure 1:
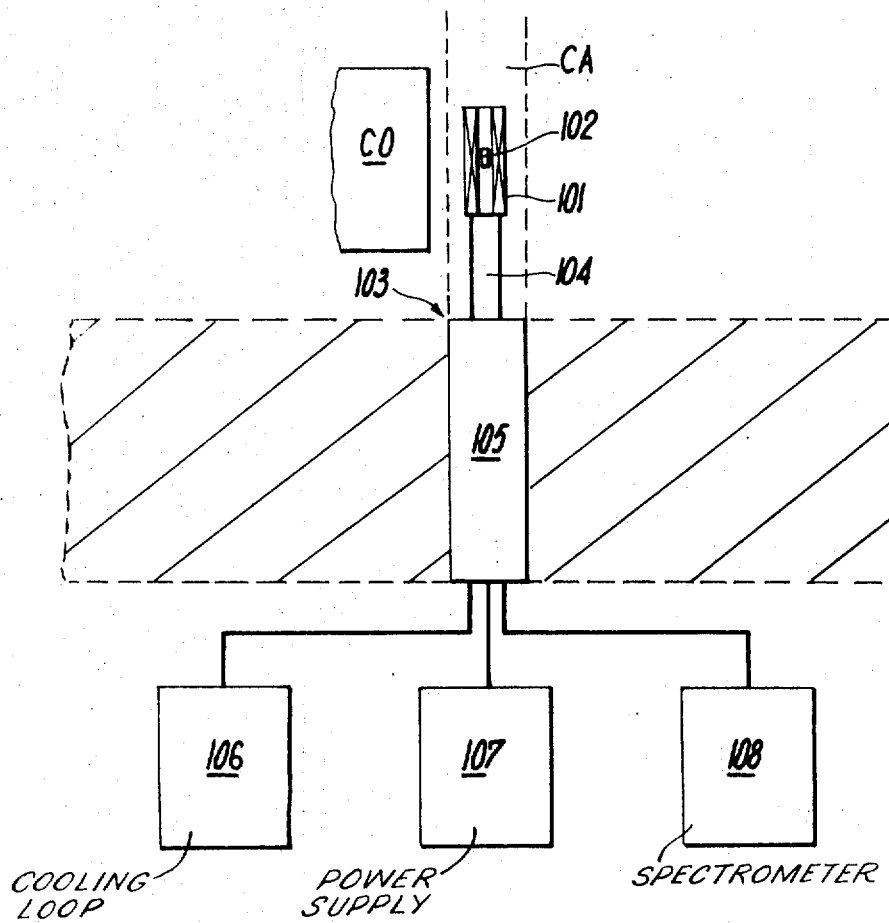
FIG. 1 is a diagrammatic view of an electron paramagnetic resonance spectrometer installation of a known type for nuclear reactors.

In accordance with a known arrangement, FIG. 1 shows a paramagnetic resonance spectrometer installation for studying flaws produced by irradiation in specimens of solid material and the kinetics of flaw formation. The specimens are placed in a resonant cavity near the core CO and in the tangential channel CA of a nuclear reactor, that is to say in a zone of intense radiation.

The installation under consideration primarily consists of a spectrometer and accessories, and comprises:

(I) A solenoid 101 with a resonant cavity 102 disposed at its center;

(II) A pole and plug assembly 103 comprising a pole 104 and a plug 105;

(III) A cooling loop 106;

(IV) A power supply unit for the solenoid 107;

(V) An electron paramagnetic resonance spectrometer 108 together with accessories.

Figure 2:
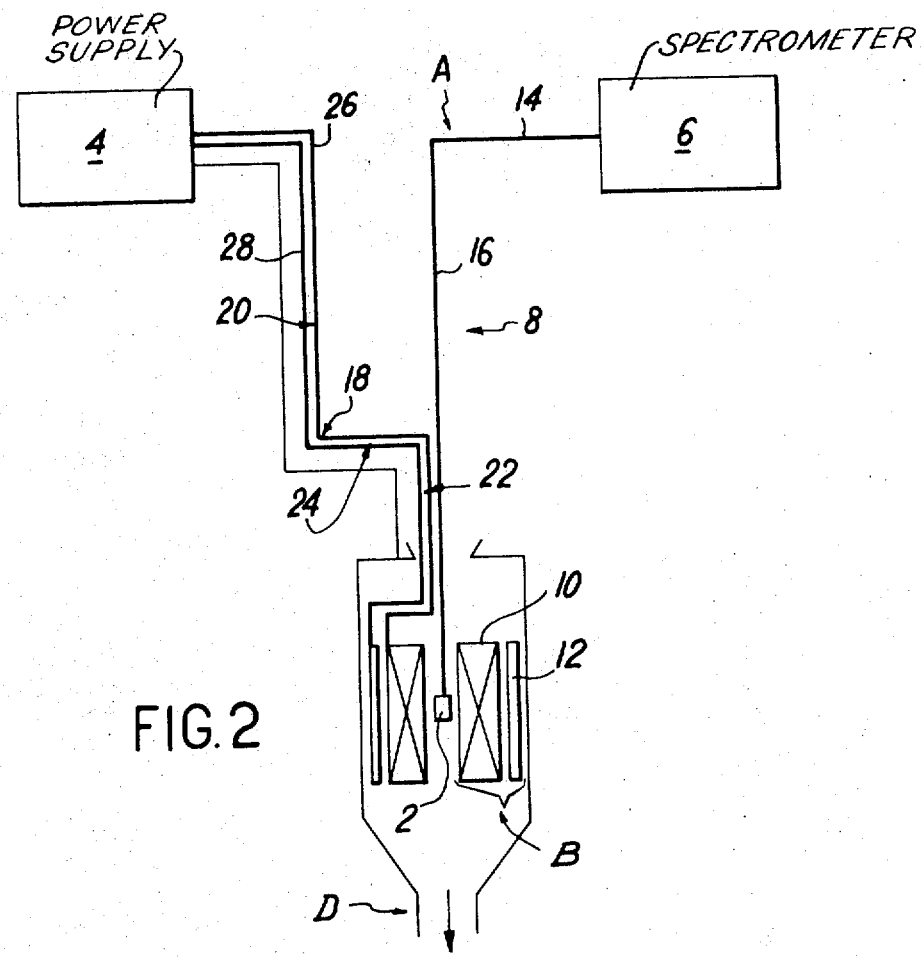
FIG. 2 is a schematic diagram showing a spectrometer assembly in accordance with the invention.

The spectrometer in accordance with the invention as shown diagrammatically in FIG. 2 must be capable of detecting electron paramagnetic resonance phenomena during irradiation. The spectrometer comprises a resonant cavity 2 which contains the specimen to be studied, a solenoid B inside which the resonant cavity is placed, a power supply unit 4, the spectrometer proper 6 and a pole 8 which serves to connect the power supply unit 4 and the spectrometer to the solenoid and to the resonant cavity.

The solenoid comprises a main coil unit 10 as well as an auxiliary coaxial compensation coil unit 12 which will be described hereinafter.

The power supply unit 4 supplies stabilized current to the solenoid in order that this latter should produce a magnetic field having a flux density of 4000 gauss and as stable as possible, and further comprises devices which serve to control the sweeping of the magnetic field.

The spectrometer 6 comprises a generator which operates in the microwave frequency range and usually consists of a klystron for the purpose of transmitting an electromagnetic wave to the resonant cavity which contains the specimen under study through a waveguide 14 forming part of the pole 8 which will be described hereinafter. Finally, said spectrometer also comprises an electronic detection unit which makes it possible to observe the resonance signal on an oscilloscope or to record said signal.

The pole 8 itself is constituted by two sections, namely a rectilinear and detachable section 14 which comprises the waveguide 16 and the cavity 2, and a stationary section 18 comprising two parallel rectilinear elements 20, 22. Said two elements are joined by a third element 24 at right angles thereto which comprises the solenoid B as well as said supply conductors 26–28. The two sections of the pole are assembled at their lower end D which is adjacent to the reactor core support grid.

Figure 7:
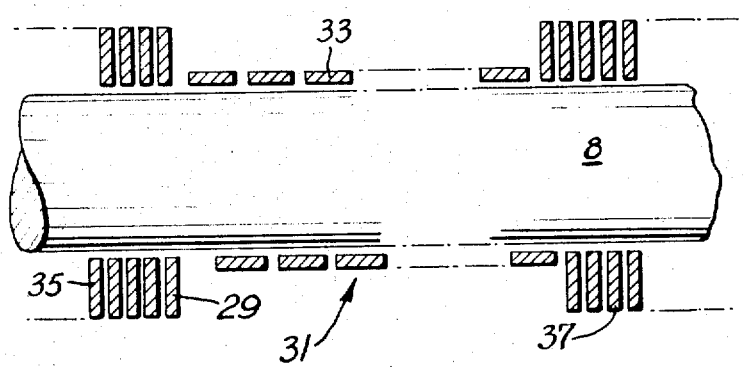
FIG. 7 is a detailed view of a part of the solenoid of FIG. 3.
Figure 3:
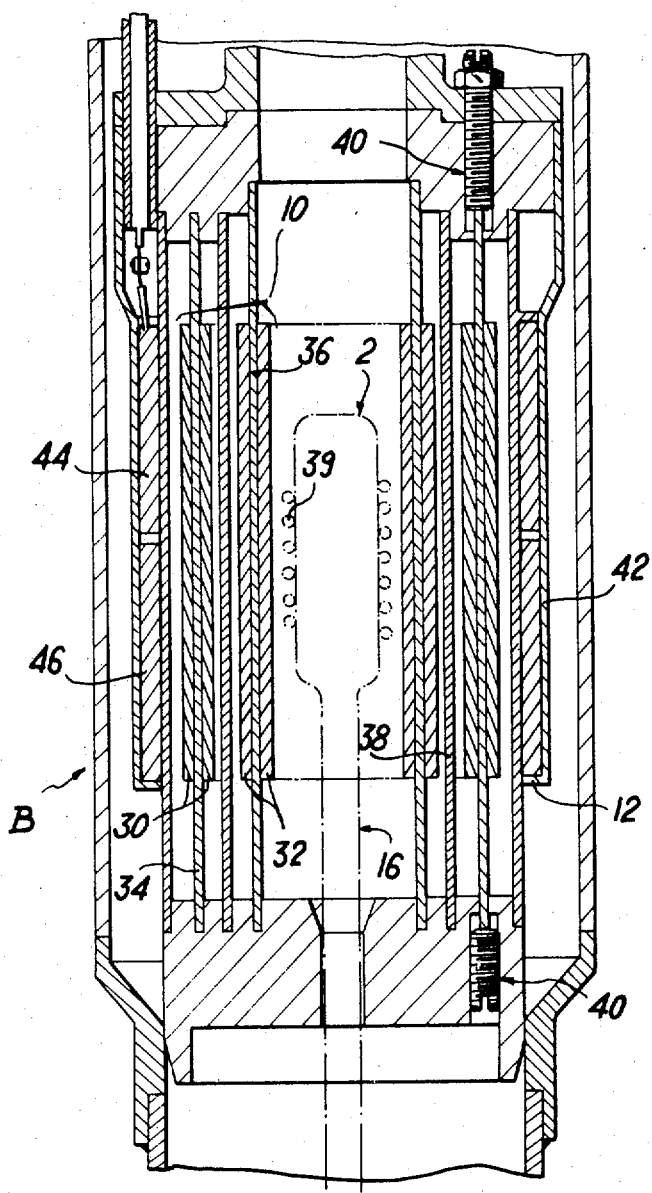
FIG. 3 is an electrical diagram showing the construction of the solenoid which forms part of the above-mentioned assembly.

As has been explained earlier, the solenoid B shown in FIG. 3 comprises a main coil unit 10 consisting of two coaxial windings 30–32 mounted in insulating cylinders 34–36. The wire forming these windings is of rectangular cross section and made of anodized aluminium, thereby dispensing with the need to employ a special insulation between the turns inasmuch as each winding has two layers. In the case of both windings, the wire is usually wound on edge except in the central portion of the outer layer of the winding 32 in which it is wound on the flat. As shown in FIG. 7 the wire making up the windings 30–32 has a rectangular section 29. Each coil has two layers. For the assembly of the two coils the wire is wound on the smaller side of the rectangular section, 35–37 except for the central part 31 of the exterior layer of the coil 32, where the wire is wound on the larger dimension 33. The two windings referred-to are separated by a tube 38 which performs the function of an insulating screen. The two windings which constitute the main coil unit can be connected together either in series or in parallel. With a view to correcting any relative displacement between the two parts of the coil unit, the outer winding can be fitted with a device 40 which permits longitudinal adjustment of its position.

The coil unit 12 which compensates for first-order heterogeneities of the magnetic field is made up of two identical coaxial windings 44–46 placed end to end and symmetrically with respect to the midplane of the main coil unit. Each winding is again formed of anodized aluminum wire, each layer being separated by a sprayed alumina coating, the complete coil unit being mounted inside a leak-tight casing 42.

Overheating of the solenoid is prevented by utilizing as coolant the water which serves to cool the reactor core and which is circulated through the centering base located at the extremity of one of the pole sections.

As has already been explained, the pole is made up of two parts, namely a rectilinear section 14 and an S-shaped section 18. The first section comprises the waveguide 16 which supplies the resonant cavity, a support 48 (shown in FIG. 4) to which the waveguide 16 is secured by means of braces 50, 52, 54, and further include the tube 56 for the supply of coolant gas to cool the resonant cavity 2 as well as including the conductors leading from modulation coil 39 to the spectrometer 6.

The S-shaped section 18 which supports the cylinder C in which the lower end of the rectilinear pole section 14 is engaged is essentially made up of supply conductors 20. Metallic strips 58 which are shown in FIG. 5 serve to supply the windings of the main coil unit while cables 60 are connected to the windings of the compensation coil unit. The conductors referred-to are maintained in correct positions by a support 62. Said support comprises a central tube 61 in which are disposed the cables 60 and flanges 66 along which the conductive strips are attached.

What we claim is:

1. An electron paramagnetic resonance spectrometer installation for detecting flaws produced in a specimen placed in the vicinity of the nuclear reactor core of a swimming pool reactor having a support grid comprising a spectrometer, a radio frequency generator and an electronic resonance detection unit in said spectrometer, a power supply unit, a pole extending into the pool water of said reactor and having one end thereof in the vicinity of the reactor core, a resonant cavity containing the specimen to be studied, said cavity being mounted on said one end of said pole, a solenoid around said cavity for producing a continuous, stable and homogeneous magnetic field to which the specimen is subjetced, said cavity and said solenoid being electrically connected by means in said pole to said radio frequency generator of said spectrometer and to said power supply, respectively, said solenoid comprising a main coil unit of two connected coaxial inner and outer windings, each of said windings having inner and outer layers, an insulation layer between said two windings, an auxiliary coil unit spaced from and coaxial with said two windings compensating for first-order heterogeneities of the magnetic field, said auxiliary coil unit comprising two identical coaxial windings mounted end to end and means for cooling said solenoid and said auxiliary coil unit by the pool water of the swimming pool reactor.

2. An installation as described in claim 1, said two coaxial windings being connected in series.

3. An installation as described in claim 1, said two coaxial windings being connected in parallel.

4. An installation as described in claim 1, including means for adjusting the longitudinal position of one of said coaxial windings of said main coil unit.

5. An installation as described in claim 4, said windings of said main coil unit being anodized aluminum wire of rectangular cross-section, said wire being normally wound on edge and being wound on the flat in the central portion of said outer layer of said inner winding.

6. An installation as described in claim 1, said pole comprising first and second sections, said solenoid being supported by said first section of said pole, said first section of said pole comprising two parallel rectilinear elements, a short element connecting said two parallel elements and perpendicular thereto, said first pole section including conductors from said power supply connected to said coil units, the lower end of said pole being secured to said support grid, said second section of said pole being substantially rectilinear and detachable from said first section, said second section carrying said resonant cavity, a wave guide for supplying said cavity from said radio frequency generator of said spectrometer forming a part of said second section, a modulation coil surrounding said cavity, conductors from said modulation coil in said second section connected to said electronic detection unit of said spectrometer and a tube in said second section for supplying coolant gas to cool said resonant cavity.

References Cited

UNITED STATES PATENTS

| | | | |
|---|---|---|---|
| 3,090,003 | 5/1963 | Rempel | 324—0.5 |
| 3,100,280 | 8/1963 | Hyde | 324—0.5 |
| 3,350,633 | 10/1967 | Hyde | 324—0.5 |

OTHER REFERENCES

Apparatus for Electron Paramagnetic Resonance at Low Fields, R. G. Marclay, Am. Journal of Phys.—29(8), pp. 492–497, August 1961.

Radiation Damage Studies Using the Techniques of Electron-Spin Paramagnetic Resonance, P. J. Bray and A. O. Williams, Contract Report for A.E.C.: Contract AT (30–1) 2024, March 1958.

RUDOLPH V. ROLINEC, Primary Examiner

M. J. LYNCH, Assistant Examiner

U.S. Cl. X.R.
176—19